US009991968B1

(12) United States Patent
Taylor et al.

(10) Patent No.: US 9,991,968 B1
(45) Date of Patent: Jun. 5, 2018

(54) DEVICES AND METHODS FOR ELECTROMAGNETIC SIGNAL PHASE DISCRIMINATION USING SQUID ARRAYS AND ELECTRO-OPTICAL MATERIALS

(71) Applicants: Benjamin J. Taylor, Escondido, CA (US); Anna M. Leese de Escobar, Encinitas, CA (US); Susan Anne Elizabeth Berggren, San Diego, CA (US)

(72) Inventors: Benjamin J. Taylor, Escondido, CA (US); Anna M. Leese de Escobar, Encinitas, CA (US); Susan Anne Elizabeth Berggren, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/604,035

(22) Filed: May 24, 2017

(51) Int. Cl.
| | |
|---|---|
| *H04B 10/54* | (2013.01) |
| *H04B 10/548* | (2013.01) |
| *H04B 10/69* | (2013.01) |
| *G02F 1/21* | (2006.01) |

(52) U.S. Cl.
CPC ............... *H04B 10/69* (2013.01); *G02F 1/21* (2013.01); *G02F 2001/212* (2013.01)

(58) Field of Classification Search
CPC .............................. H04B 10/54; H04B 10/548
See application file for complete search history.

(56) References Cited

U.S. PATENT DOCUMENTS

| | | | |
|---|---|---|---|
| 4,468,635 A | 8/1984 | Lukens et al. | |
| 4,470,023 A | 9/1984 | Lukens et al. | |
| 5,933,001 A * | 8/1999 | Hubbell ............. | G01R 33/0354 250/227.19 |
| 6,690,162 B1 | 2/2004 | Schopohl et al. | |

(Continued)

OTHER PUBLICATIONS

P. Caputo et al., "High-performance magnetic field sensor based on superconducting quantum interference filters." Appl. Phys. Lett. 85, 1389 (2004).

(Continued)

*Primary Examiner* — Shi K Li
(74) *Attorney, Agent, or Firm* — SPAWAR Systems Center Pacific; Kyle Eppele (57) ABSTRACT

An electromagnetic signal is received at first and second Superconducting Quantum Interference Device (SQUID) SQUID arrays. The first and second SQUID arrays output respective voltage signals corresponding to the electromagnetic signal as received at the first and second SQUID arrays. The first and second SQUID arrays are spaced apart such that there is a phase difference between the electromagnetic signal as received at the first and second SQUID arrays. The phase difference results in a voltage amplitude difference. At least one of the voltage signals is applied to at least one reference optical signal input into an electro-optical device to modify the reference optical signal. The modified optical signal output by the electro-optical device includes a change compared to the reference optical signal. The change is indicative of the phase difference in the electromagnetic signal as received at the first and second SQUID arrays.

20 Claims, 3 Drawing Sheets

(56) References Cited

U.S. PATENT DOCUMENTS

| | | |
|---|---|---|
| 7,369,093 B2 | 5/2008 | Oppenlander et al. |
| 8,179,133 B1 * | 5/2012 | Kornev .............. G01R 33/0354 324/225 |

OTHER PUBLICATIONS

J. Oppenlander et al., "Superconducting Quantum Interference Filters Operated in Commercial Miniature Crycoolers," IEEE Trans. Appl. Supercond. , vol. 15, No. 2 (2005).

A. K. Kalabukhov et al., "Analysis of the Possibility to Amplify an RF Signal with a Superconducting Quantum Interference Filter," J. Commun. Techn. and Elect., vol. 53, No. 8 (2008).

G.V. Prokopenko et al., "DC and RF Measurements of Serial Bi-SQUID Arrays," IEEE Trans. App. Supercond., vol. 23, No. 3 (2013).

R.C. Alfemess, "Waveguide Electrooptic Modulators," IEEE Trans. Microwave Theory Tech., vol. MTT-30, No. 8 (1982).

D. Janner et al., "Micro-structured integrated eletro-optic LiNbO3 Modulators," Laser & Photon, Rev. 3, No. 3 (2009).

R. Noe et al., "38-krad/s 3.8-Grad Broadband Endless Optical Polarization Tracking Using LiNbO3 Device," IEEE Photon. Technol. Lett., vol. 21, No. 17 (2009).

R. C. Miller et al., "Optical Second Harmonic Generation in Piezo Electric Crystals," Appl. Phys. Lett. 5, 17 (1964).

M. M. Fejer et al., "Quasi-Phase-Matched Second Harmonic Generation: Tuning and Tolerances," IEEE J. Quantum Electron, vol. 28, No. 11 (1992).

B. Di Bartolo et al., "Nano-Optics for Enhancing Light-Matter Interactions on a Molecular Scale," NATO Science for Peace and Security Series B: Physics and Biophysics (2013).

A. Yariv, "Optical Electronics in Modern Communications," 5th Ed., Oxford U. Press, pp. 326-371 (1997).

J.-J. Kao et al., "Theoretical and Experimental Studies of Polarization Mode Dispersion of an Electro-Optic Mach-Zehnder Modulator," Appl. Optics, vol. 44, No. 26 (2005).

M. Melnichuck et al., "Direct Kerr electro-optic effect in noncentrosymmetric materials," Phys. Rev. A 82, 013821 (2010).

M. Tachiki et al., "Mechanism of Terahertz ElectromagneticWave Emission from Intrinsic Josephson Junctions," Phys. Rev. Lett., 102, 127002 (2009).

A. Valizadeh et al., Single phase-slip junction site can synchronize a parallel superconductor array of linearly coupled Josephson junctions, Phys. Rev. B 82, 144520 (2010).

V. M. Krasnov, "Terahertz electromagnetic radiation from intrinsic Josephson junctions at zero magnetic field via breather-type self-oscillations." Phys. Rev. B 83, 174517 (2011).

T. M. Benseman et al., "Tunable terahertz emission from . . . mesa devices," Phys. Rev. B84, 064523 (2011).

A. Valizadeh, "Enhanced response of regular networks to local signals in the presence of a fast impurity," Phys. Rev. E86, 016101 (2012).

C. McConaghy et al., "The Performance of Pigtailed Annealed Proton Exchange LiNbO3 Modulators at Cryogenic Temperatures," IEEE Photonics Technol. Lett. 8, No. 11 (1996).

J. Shikata et al., "Enhancement of terahertz-wave output from LiNbO3 optical parametric oscillators by cryogenic cooling," Optics Lett. vol. 24, No. 4 (1999).

O. Menendez et al., "Performance Projection of Electro-Optical Modulators for Radio-Over-Fiber in 2 GHz Cryogenic Front-End Receivers," IEEE Trans. App. Supercon., vol. 15, No. 2 (2005).

S. Berggren et al., "Simulated bi-SQUID Arrays Performing Direction Finding," Technical Report 2089, SSC Pacific (2015).

T. Clancy et al., "Phase Interferometry Direction Finding," LLincoln Laboratory, MIT, Group 108 (2012).

L. Ozyuzer et al., "Emission of Coherent Thz Radiation from Superconductors", Science 318, 1291 (2007).

* cited by examiner

DEVICES AND METHODS FOR ELECTROMAGNETIC SIGNAL PHASE DISCRIMINATION USING SQUID ARRAYS AND ELECTRO-OPTICAL MATERIALS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103416.

FIELD OF THE INVENTION

The present invention relates to discrimination of phase of an electromagnetic signal as received at different sensors. More particularly, the present invention relates to phase discrimination of an incident electromagnetic signal using SQUID arrays and electro-optical devices.

BACKGROUND

Determining the location of the source of an electromagnetic signal is important for signal intelligence gathering, targeting, and weapon delivery directing, navigation, etc. The expanding and increasingly innovative use of the radio frequency spectrum across a wide range of environments requires an improvement in the existing capabilities in direction sensing in order to detect signals at longer distances and lower powers and to provide higher precision in directionality determination, all while evading detection by potentially hostile forces.

Conventional radio frequency direction finding (RFDF) systems often employ an array of multiple electrically resonant antennas. The direction of an incoming signal is determined based on a phase difference of an incoming signal as received at each of the antennas.

Figure 1:
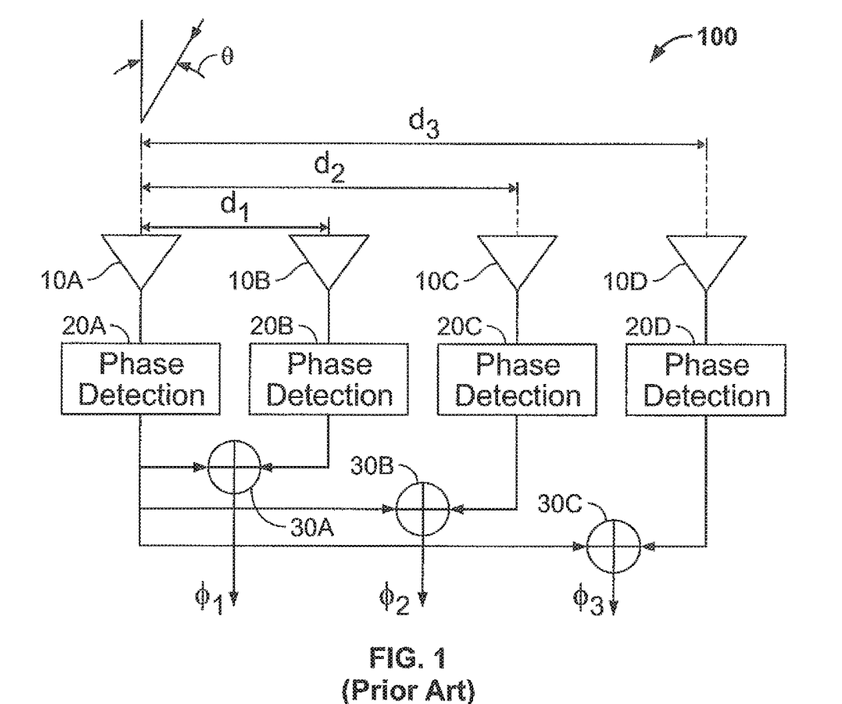
FIG. 1 illustrates a conventional prior art broadband direction finding antenna array.

This may be understood with reference to prior art FIG. 1 which shows an example of an antenna array used for radio frequency direction finding. As shown in FIG. 1, the array 100 includes multiple antennas 10A, 10B, 100 and 10D that receive an incoming signal of wavelength λ at an incident angle θ relative to the array 100. The antennas are spaced apart, such that there is a distance $d_1$ between antennas 10A and 10B, a distance $d_2$ between antennas 10A and 100, and a distance $d_3$ between antennas 10A and 10D, and so on and so forth up to a distance $d_{n-1}$ for n antennas. As shown in FIG. 1, when an incoming electromagnetic signal arrives at the array, the phase (or timing) of the signal as received at each antenna 10A, 10B, 100 and 10D is detected by phase detectors 20A, 20B, 20C, and 20D, respectively.

The differences between the detected phases of the signal as received at antenna 10A and each of the antennas 10B, 100 and 10D are determined by phase comparators 30A, 30B and 30C through $30_{n-1}$ and output as phase difference outputs $ø_1$, $ø_2$ and $ø_3$ through $ø_{n-1}$, respectively.

In general, the relationship between the phase difference, Δø, of an electromagnetic signal received by two antennas separated by a distance d is given as a function of wavelength, λ, the distance, and angle of arrival (θ), where:

$$\theta = \sin^{-1}[\lambda\Delta_\phi/2\pi d] \quad (1)$$

such that the phase difference is given by:

$$\Delta\emptyset = (2\pi d/\lambda)\sin\theta \quad (2)$$

Applying these equations to the antenna array depicted in FIG. 1, the angle of arrival θ, which corresponds to the direction of the incoming electromagnetic signal, can be derived from the phase difference outputs $ø_1$, $ø_2$ and $ø_3$ of the respective phase comparators 30A, 30B, and 30C. This calculation can be typically performed by a digital signal processor.

Existing radio frequency direction finding (RFDF) systems built from conventional electrically resonant antennas such as those depicted in FIG. 1 are necessarily frequency range limited. This means that to cover a full radio frequency (RF) spectrum, an RFDF system must include many antenna and receiver chain elements. Also, the physical dimensions of such systems are subject to ¼ wavelength baseline restrictions. This means that high frequency (HF) direction finding and similar long wavelength sensing systems are necessarily physically large and subject to detection and disruption by potentially hostile forces.

There is thus a need for a phase difference discrimination system that can be used for broadband direction finding and can be implemented on a small platform.

SUMMARY

According to illustrative embodiments, an electromagnetic signal is received at first and second Superconducting Quantum Interference Device (SQUID) arrays. The first and second SQUID arrays output respective voltage signals corresponding to the electromagnetic signal as received at the first and second SQUID arrays. The first and second SQUID arrays are spaced apart such that there is a phase difference between the electromagnetic signal as received at the first and second SQUID arrays. The phase difference results in a voltage amplitude difference. At least one of the voltage signals is applied to at least one reference optical signal input into an electro-optical device to modify the reference optical signal. The modified optical signal output by the electro-optical device includes a change compared to the reference optical signal. The change is indicative of the phase difference in the electromagnetic signal as received at the first and second SQUID arrays.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION

According to illustrative embodiments, broadband direction finding of electromagnetic signals may be achieved with the integration of two or more Superconducting Quantum Interference Device (SQUID) array sensors and an electro-optical device. Voltage outputs from the SQUID arrays are used to bias the electro-optical device or modulate the optical signal produced by the electro-optical device. The difference in the phase (or timing) of a signal received at the SQUID arrays is determined based on the output of the electro-optical device. The phase difference enables the derivation of the direction from which the electromagnetic signal is received.

As those skilled in the art will appreciate, a SQUID array includes many individual SQUIDs arranged in a circuit in a fashion resulting in a linear and highly sensitive magnetic field sensor. A SQUID array is capable of detecting incident electromagnetic signals at frequencies from DC well into the GHz range and outputting voltage signals representing the detected electromagnetic signals. Thus, SQUID arrays are suitable as broadband sensors in an electromagnetic signal detection system.

According to illustrative embodiments, SQUID arrays used as sensors are separated by a given distance (fixed or adjustable). The phase difference in an incoming electromagnetic signal detected by the SQUID arrays will result in a corresponding difference in voltage outputs by the SQUID arrays. That is, the phase shift between the signal as detected by the SQUID arrays will result in voltage outputs of the SQUID arrays being shifted by the same amount. Thus, the phase difference in the incoming signal received at the SQUID arrays can easily be discerned from the voltage difference of the voltage outputs of the SQUID arrays. Since the distance d between the SQUID arrays is known, based on the distance between the SQUID arrays and the phase difference of the detected incoming signal, the direction of the incoming signal may be discerned. Although direction finding is not discussed in further detail here, those of ordinary skill in the art will be appreciate that direction finding may be performed, for example, by a digital processor using suitable algorithms based on the phase difference between the electromagnetic signal as received at the SQUID arrays.

In the following, three basic designs are described which utilize key properties of electro-optical materials in various manners so that the voltage difference between the voltage signals produced by independent spaced apart SQUID arrays may be determined to a high degree of accuracy. Other configurations could certainly be used without departing from the scope of the present invention.

Figure 2:
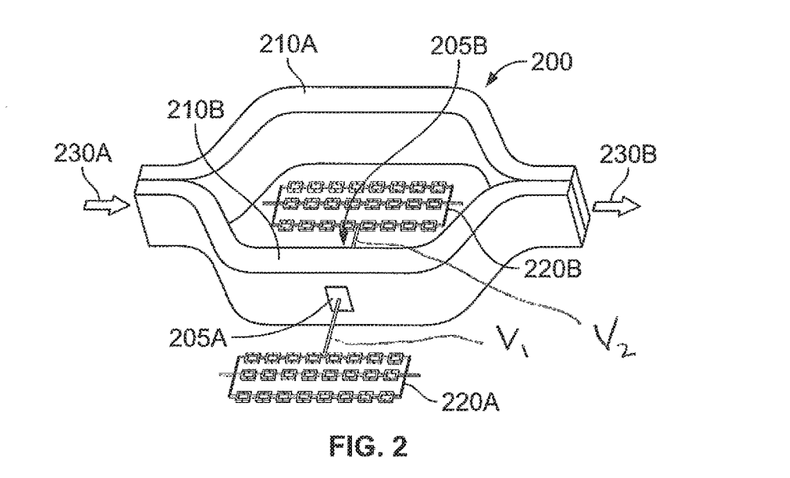
FIG. 2 illustrates an apparatus for discriminating a phase difference between an electromagnetic signal received at first and second SQUID arrays using a Mach-Zehnder interferometer according to an illustrative embodiment.

According to a first illustrative embodiment, and referring now to FIG. 2, a Mach-Zehnder type interferometer and two SQUID arrays are used for phase difference discrimination. As shown in FIG. 2, two SQUID arrays 220A and 220B detect an incoming electromagnetic signal. The electromagnetic signal is received from a signal source (not shown) at a direction relative to the SQUID arrays. The SQUID arrays 220A and 220B output voltage signals $V_1$ and $V_2$, respectively, which correspond to the electromagnetic signal as detected at the SQUID arrays 220A and 220B. The SQUID arrays 220A and 220B are spaced apart, such that there is a difference in phase or timing of receipt of the electromagnetic signal by the SQUID arrays 220A and 220B. This difference in phase results in a voltage difference $\Delta V \equiv |V_1 - V_2|$ between the voltage signals output by the SQUID arrays 220A and 220B.

An input reference optical signal 230A entering the Mach-Zehnder type interferometer 200 is split between the two arms 210A and 210B of the interferometer. The voltage difference $\Delta V \equiv |V_1 - V_2|$ between the voltage outputs of the SQUID arrays 220A and 220B is applied to one arm 210B of the Mach-Zehnder type interferometer 200 via voltage terminals 205A and 205B (in FIG. 2, terminal 205B is located in the inside surface of arm 210B). That is, the voltage output $V_1$ from the SQUID array 220A is applied to the voltage terminal 205A, and the voltage output $V_2$ from the SQUID array 220B is applied to the voltage terminal 405B. The voltage difference $\Delta V \equiv |V_1 - V_2|$ drives the electro-optical modulation and/or polarization of the reference input optical signal 230A that flows through the arm 210B. The voltage difference causes a shift in phase of the optical signal flowing through the arm 210B in comparison to the optical signal flowing through the arm 210A.

When the split optical signal is recombined, the result is a modified output optical signal 230B that is shifted in phase from the input reference optical signal 230A. This phase shift corresponds to the difference in phase of the incoming electromagnetic signal as received by the SQUID arrays 220A and 220B. Based on the phase difference, a direction of the incoming electromagnetic signal may be determined in a manner such as that described above.

In the configuration shown in FIG. 2, the SQUID arrays 220A and 220B are arranged on either side of either arm 210 of the interferometer 200. The placement and dimensions of the SQUID arrays 220A and 220B may be varied with respect to the interferometer 200 as desired so as to achieve the best results. Additionally, the SQUID arrays 220A and 220B need not be integrated on the same substrate as the arm 210B but may be located remotely, with their voltage outputs being fed to the arm 210B.

Figure 3:
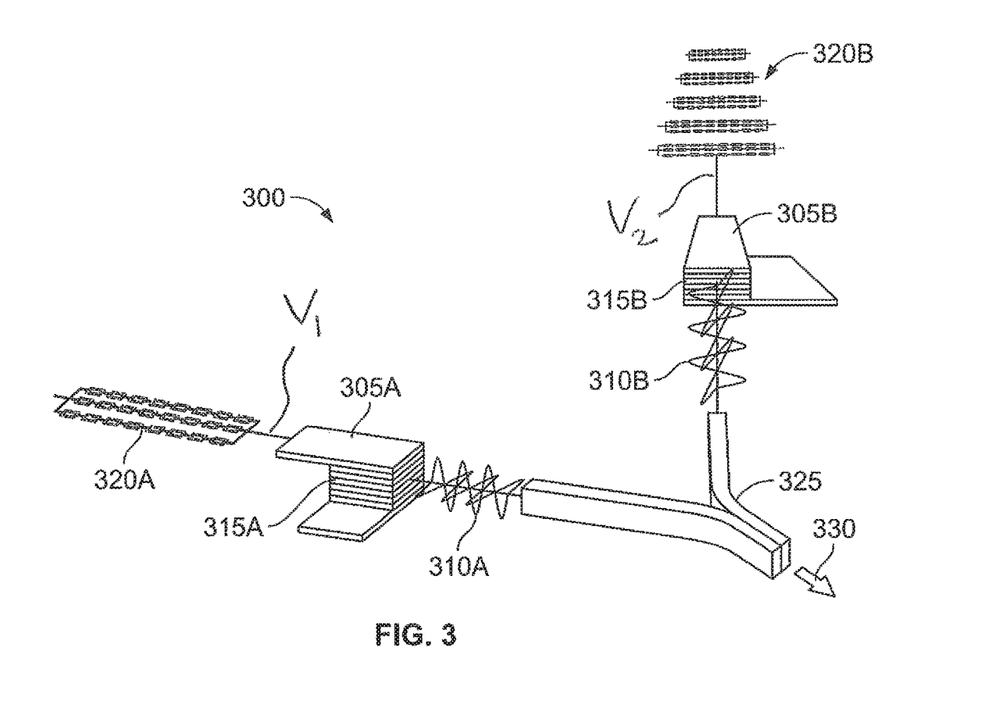
FIG. 3 illustrates an apparatus for discriminating a phase difference between an electromagnetic signal received at first and second SQUID arrays using Josephson Junction (JJ) stack lasers and an optical signal combiner that is analogous to a truncated Mach-Zehnder interferometer, according to another illustrative embodiment.

According to a second embodiment, and referring now to FIG. 3, two SQUID arrays are integrated with linear arrays of Josephson Junction (JJ) stacks and an optical transmission pathway. A SQUID array can be thought of as a single circuit comprising of many individual SQUID elements, which themselves can be further composed from JJs. A JJ stack can include intrinsic tunnel junctions that can naturally exist in certain layered superconductors, and that can function as JJ's. One such JJ stack can be the compound $Bi_2Sr_2CaCu_2O_8$(BSCCO), as described in by L. Ozyuzer, et al., in "Emissions of Coherent THz Radiation from Superconductors", Science 318, 1291 (2007). As shown in FIG. 3, the optical transmission pathway is an optical signal combiner 325 that is analogous to a truncated half-Mach-Zehnder interferometer. The optical signal combiner 325 has two inputs into which photon fields, also referred to as laser outputs 310A and 310B, are fed. The photon fields 310A and 310B are generated by two on-chip lasers comprised of phase locked linear arrays of JJ stacks 315A and 315B, respectively. The JJ stacks 315A and 315B are lasers that emit coherent radiation as photon fields in the THz range. The JJ stacks may be c-axis oriented. Alternatively, a linear array of in-plane (ab-axis oriented) Josephson Junctions may be fabricated using, for example, the ion damage method.

SQUID arrays 320A and 320B are connected with the JJ stacks 315A and 315B via voltage terminals 305A and 305B, respectively. The SQUID arrays 320A and 320B detect an incoming electromagnetic signal from a source (not shown) at a direction relative to the SQUID arrays. The SQUID arrays 320A and 320B produce voltage outputs $V_1$ and $V_2$ corresponding to the electromagnetic signal as received at the respective arrays. The SQUID arrays 320A and 320B are spaced apart such that there is a phase difference of the electromagnetic signal as received at the SQUID arrays. This phase difference results in a voltage difference $\Delta V = |V_1 - V_2|$ between the voltage outputs $V_1$ and $V_2$.

The JJ stacks 315A and 315B generate identical reference optical signals. However, according to various aspects, the reference optical signal output by a JJ stack may be modified by applying a bias voltage to either JJ stack 315. In the interest of clarity of illustration, biasing connections are not shown.

According to one aspect, the output voltage $V_1$ from the SQUID array 320A is used as the bias voltage for the JJ stack 315A. Similarly, the output voltage $V_2$ from the SQUID array 320B is used as the bias voltage for the JJ stack 315B. Given the different bias voltages applied to the JJ stacks 315A and 315B due to the differences in time of receipt of the electromagnetic signal, there is a timing difference between the optical signals 310A and 310B. The optical signals 310A and 310B are transmitted into separate optical pathways of the optical combiner 325 that converge to produce an output optical signal 330. Convergence of the optical signals may be carried out on-chip or at a remotely located device.

The timing difference between the optical signals 310A and 310B results in interference in the form of a timing difference or phase difference in the output optical signal 330. The timing difference is a function of the voltage difference between the voltages $V_1$ and $V_2$. As the voltage difference corresponds to a phase difference of the incoming electromagnetic signal at the SQUID arrays 320A and 320B, the timing difference in the output signal 330 may be used to determine the direction of the incoming signal in a manner as described above.

According to another aspect of the second embodiment, the difference of the voltages $\Delta V \equiv |V_1 - V_2|$ from the two SQUID arrays 320A and 320B may be used as the bias voltage of one JJ laser, for example the JJ stack 315A, while the second JJ laser 315B can be used as a reference signal, or alternatively can be left unused. Biasing of the JJ stack 315A will result in a shift of the output frequency and hence an optical output 310A having a different frequency than its unbiased state as well as the reference optical signal produced by the (unbiased) JJ stack 315B when used. The biased output of the JJ stack 315A may be fed through an optical pathway, such as one end of the optical combiner 325. It should be appreciated that the optical combiner 325 is shown as a truncated half-Mach Zehnder interferometer by way of example, and that any other suitable optical pathway may be used.

Due to the biasing of the JJ stack 315A by the voltage difference, the optical output 330 has either a shift in frequency from the unbiased JJ stack 315A (when JJ stack 315B is unused), or a combination of the interference of the signals at the two frequencies, i.e., that of JJ stack 315A and the reference optical signal produced by the JJ stack 315B. As frequency is related to wavelength, the change of the output frequency may be used, in combination with the voltage difference, to determine the difference of the phase of the incoming signal at the two SQUID arrays. Based on the phase difference, the direction of the incoming signal may be discerned in a manner as described above.

Figure 4:
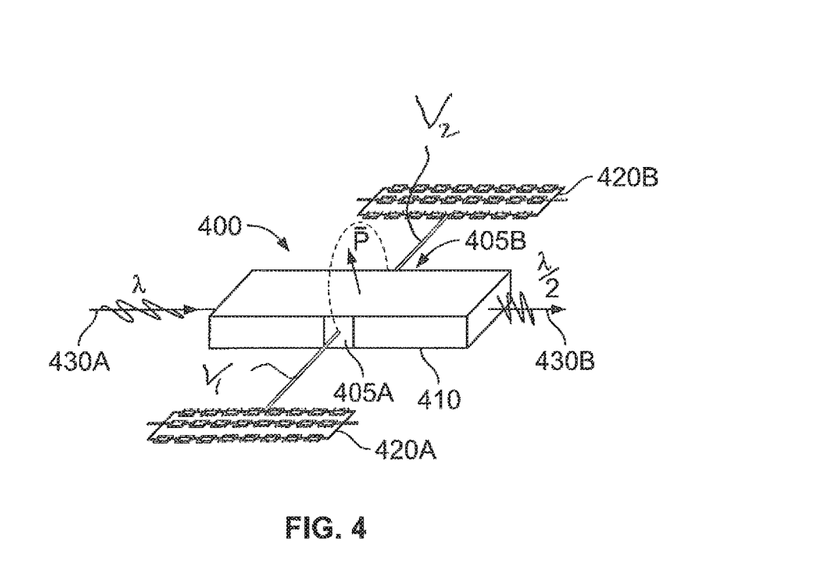
FIG. 4 illustrates an apparatus for discriminating a phase difference between an electromagnetic signal received at first and second SQUID arrays using a second harmonic generator (SHG) optical pathway according to another illustrative embodiment.

Referring now to FIG. 4, according to a third embodiment, a Second Harmonic Generation (SHG) optical pathway formed of a crystal is integrated on the same substrate as two SQUID arrays. As shown in FIG. 4, the SHG can receive a reference input optical signal 430A at a fundamental wavelength $\lambda$ and can output a signal 430B at a half wavelength $\lambda/2$. The SHG 410 can be driven by two SQUID arrays 420A and 420B. The SQUID arrays 420A and 420B may be placed on opposite sides of the SHG 410 and connected to the SHG 410 via voltage terminals 405A and 405B, respectively.

In FIG. 4, "P" can be the internal electric field polarization vector of the SHG crystal 410, $P = (\varepsilon)E$, where $\varepsilon$ is the electric permittivity constant (a tensor really) and E is the applied external electric field vector. The electric field vector can be caused by the voltage difference across the opposing faces of the SHG crystal 410 by the SQUID arrays 420A and 420B.

The SQUID arrays 420A and 420B detect an incoming electromagnetic signal from a signal source (not shown) at a direction relative to the SQUID arrays. The SQUID arrays 420A and 420B produce voltage outputs $V_1$ and $V_2$, respectively, that can correspond to the incoming signal as detected by the SQUID arrays 420A and 420B. There is a difference in the voltage signals $V_1$ and $V_2$ that corresponds to a phase difference of the electromagnetic signal as received at the SQUID arrays 420A and 420B. The voltage outputs $V_1$ and $V_2$ are supplied to the SHG 410, such that the SHG frequency is amplitude/phase modulated by the difference of the voltages $\Delta V \equiv |V_1 - V_2|$.

According to this embodiment, the SHG can be made of a non-linear non-centrosymmetric optical crystal material. The interaction between the linearly polarized input (pump) optical reference signal 430A at a characteristic fundamental frequency $\omega$ and the optical material of the SHG 410 results in the generation of an output signal 430B (the second harmonic) at $2\omega$. The amplitude of the SHG output, $|E(2\omega)|$, is dependent upon input pump power, polarization of the input signal, and focusing of the beam. The amplitude of the SHG output signal 430B also depends on the index of refraction of the SHG.

The amplitude of the SHG output signal 430B can be further proportional to a phase mismatch $\Delta k$ caused by the SHG. That is, $|E(2\omega)| \propto \mathrm{sinc}(\Delta k L/2)$, where L is the optical path length of the crystal and $\Delta k \propto (n_1 - n_2)$. The variables $n_1$ and $n_2$ are the indices of refraction of the fundamental and second-harmonic waves along the polarization vector of the input pump signal, respectively. The variables $n_1$ and $n_2$ are, in turn, responsive to applied mechanical stress and electrostatic and electro-dynamic fields via a modification of the dielectric tensor, including the voltage difference between the voltage outputs from the SQUID arrays 420A and 420B.

Application of the voltage difference $\Delta V$ from the SQUID arrays 420A and 420B across a length of the SHG producing crystal 410 alters the amplitude of the SHG signal optical output. Based on the amplitude of the optical output signal 430B, the phase mismatch $\Delta k$ may be determined, as well as the difference in the indices of refraction, or $n_1 - n_2$. As those skilled in the art will appreciate, based on the difference in the indices of refraction caused by application of the voltage difference, the value of the voltage difference $\Delta V$ may be determined. The voltage difference $\Delta V$ may then be used to determine the phase difference of the incoming electromagnetic signal as detected at the two SQUID arrays 420A and 420B. Based on the phase difference, the direction of the incoming signal may be determined in a manner described above.

The SHG 410 may be integrated on the substrate carrying the SQUID arrays as shown in FIG. 4. Alternatively, the SHG 410 may be remotely located.

In the drawings above, some details have been eliminated in the interest of clarity of illustration. For example, although not shown, one end of each SQUID array may be connected to ground, and the other end connected to a voltage terminal of the optical electrical devices described above.

Figure 5:
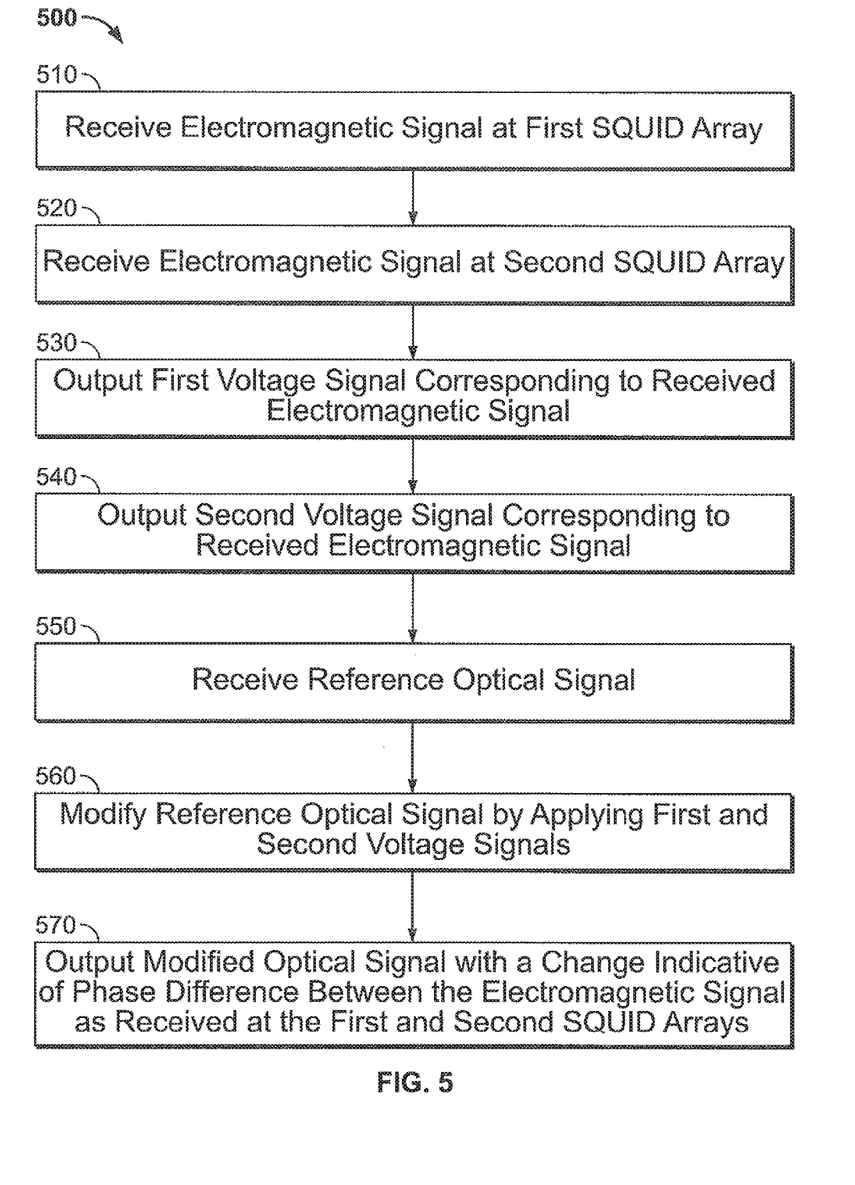
FIG. 5 shows a method for discriminating a phase difference between an electromagnetic signal received at first and second SQUID arrays according to illustrative embodiments.

FIG. 5 illustrates a method for discriminating a phase difference between an electromagnetic signal received at first and second SQUID arrays according to an illustrative embodiment. It should be appreciated that the steps and order of steps described and illustrated are provided as examples. Fewer, additional, or alternative steps may also be involved in the fabrication of the shield, and/or some steps may occur in a different order.

The method 500 begins at step 510 at which an electromagnetic signal is received at a first SQUID array. At step 520, the electromagnetic signal is received at a second SQUID array. At step 530, the first SQUID array outputs a first voltage signal corresponding to the received electromagnetic signal. At step 540, the second SQUID array outputs a second voltage signal. As explained above with regard to various embodiments, the first and second SQUID arrays are spaced apart by a known distance "d" such that there is a phase difference between the electromagnetic signal as received at the first SQUID array and the electromagnetic signal as received at the second SQUID array. This phase difference results in a voltage difference between the first voltage signal and the second voltage signal.

At step 550, at least one reference optical signal is received by an electro-optical device, such as the Mach-Zehnder interferometer 200, the truncated interferometer 325, or the SHG 410 described above. At step 560, the reference optical signal is modified by applying the first voltage signal and the second voltage signal to the reference optical signal. As described above, the first and second voltage signals may be applied in the form of the voltage difference between the first and second voltage signals, or the first and second voltage signals may be applied as bias voltages.

At step 560, the electro-optical device outputs a modified optical signal including a change compared to the reference optical signal. The change is indicative of a phase difference between the electromagnetic signal as received at the first SQUID array and the electromagnetic signal as received at the second SQUID array. The phase difference may be used to determine the direction from which the electromagnetic signal is received.

According to illustrative embodiments, the broadband nature and high dynamic range and sensitivity of SQUID arrays (DC-GHz), combined with the ability to package the SQUID arrays in a physically small receiving package, makes SQUID arrays ideal candidates for the development of a full spectrum RFDF system serving a wide range of platforms. Also, the distance between the SQUID arrays is not limited by the ¼ wavelength baseline restrictions of conventional antennas. The integration of optical materials enables the exploitation of sensitive electro-optical properties in a manner so that the difference of the phase between the voltage signals produced by independent SQUID array circuits, separated distances that may be less than % wavelengths, may be measured precisely.

According to illustrative embodiments, the SQUID arrays may be made of $YBa_2Cu_3O_7$ films deposited on $LiNbO_3$ substrates (or multilayer configuration of $YBa_2Cu_3O_7$ and $LiNbO_3$ films deposited on a third material substrate).

More complex designs can be built by utilizing a combination of the basic designs described above to potentially achieve even higher signal phase sensitivity.

As indicated above, the SQUID arrays may be located remotely or be integrated with the electro-optical devices. In order to reduce the thermally induced noise contribution to the uncertainty of the phase difference measurements, the designs may be integrated such that the SQUID arrays and the electro-optical circuitry are on a signal substrate or wafer. In such an arrangement, the electro-optical devices are operated at cryogenic temperatures. However, similar designs could involve a relatively large spatial separation of cryogenically operated SQUID arrays whose voltage outputs are connected to an electro-optical circuit at a third location which may be operated at cryogenic or non-cryogenic temperatures.

As an alternative, while $LiNbO_3$ can be the material mostly commonly used in non-linear optical devices, other materials having similar physical/optical properties may be used. In the case of the integrated SQUID array and electro-optical circuitry, the non-linear optical material necessarily must be structurally compatible with the compounds used to fabricate the SQUID arrays and must be amenable to the fabrication process of the SQUID array material. The compound considered here for use in fabricating the SQUID array sensors is the high-temperature (high $T_c$) cuprate superconductor $YBa_2Cu_3O_x$ ($6.3 \leq x \leq 7$). However, other suitable superconducting compounds may be used as well.

It will be understood that many additional changes in the details, materials, steps and arrangement of parts, which have been herein described and illustrated to explain the nature of the invention, may be made by those skilled in the art within the principle and scope of the invention as expressed in the appended claims.

What is claimed is:

1. A method, comprising:
   receiving, by a first Superconducting Quantum Interference Device (SQUID) array, an electromagnetic signal;
   receiving, by a second SQUID array, the electromagnetic signal;
   outputting, by the first SQUID array, a first voltage signal corresponding to the electromagnetic signal as received by the first SQUID array;
   outputting, by the second SQUID array, a second voltage signal corresponding to the electromagnetic signal as received by the second SQUID array, wherein the first and second SQUID arrays are spaced apart such that there is a phase difference between the electromagnetic signal as received at the first SQUID array and the electromagnetic signal as received at the second SQUID array that results in a voltage difference between the first voltage signal and the second voltage signal;
   receiving, by an electro-optical device, at least one reference optical signal;
   modifying said at least one reference optical signal by applying at least one of the first voltage signal and the second voltage signal to the at least one reference optical signal; and,
   outputting, by the electro-optical device, a modified output optical signal including a change compared to said at least one reference optical signal, the change being indicative of the phase difference between the electromagnetic signal received at the first SQUID array and the electromagnetic signal received at the second SQUID array.

2. The method of claim 1, wherein the phase difference between the electromagnetic signal received at the first SQUID array and the electromagnetic signal received at the second SQUID array is indicative of a direction from which the electromagnetic signal is received.

3. The method of claim 1, wherein the change in the modified output optical signal includes a phase shift.

4. The method of claim 1, wherein the change in the modified output optical signal is an amplitude change.

5. The method of claim 1, wherein the change in the modified output optical signal is a frequency change.

6. The method of claim 1, wherein the first and second voltage signals are applied to the at least one reference optical signal as a voltage difference via the electro-optical device.

7. The method of claim 1, wherein the first voltage signal is applied to the reference optical signal to produce a first modified reference optical signal, and the second voltage signal is applied to the reference optical signal to produce a second modified reference optical signal.

8. The method of claim 7 wherein the electro-optical device receives the first and second modified reference optical signals and combines the first and second modified reference optical signals to produce a combined modified output optical signal.

9. The method of claim 8, wherein the combined modified output optical signal includes a timing difference between the first and second modified reference optical signals that is indicative of the phase difference between the electromagnetic signal received at the first SQUID array and the electromagnetic signal received at the second SQUID array.

10. An apparatus, comprising:
a first Superconducting Quantum Interference Device (SQUID) array receiving an electromagnetic signal and outputting a first voltage signal representing the received electromagnetic signal;
a second SQUID array receiving the electromagnetic signal and outputting a second voltage signal representing the received electromagnetic signal, wherein the electromagnetic signal is received from a signal source at a direction relative to the first and second SQUID arrays, and wherein the first and second SQUID arrays are spaced apart such that there is a phase difference between the electromagnetic signal as received at the first SQUID array and the electromagnetic signal as received at the second SQUID array that results in a voltage difference between the first voltage signal and the second voltage signal; and
an interferometer receiving at least one reference optical signal, wherein the first and second voltage signals are applied to the at least one reference optical signal to modify the at least one reference optical signal such that the interferometer outputs a modified optical signal including a change compared to the at least one reference optical signal, the change being indicative of phase difference between the electromagnetic signal as received at the first SQUID array and the electromagnetic signal as received at the second SQUID array, the phase difference being indicative of the direction from which the electromagnetic signal is received.

11. The apparatus of claim 10, wherein the interferometer is a Mach-Zehnder interferometer including a first arm and a second arm, and wherein the first voltage signal and the second voltage signal are applied as a voltage difference to the at least one reference optical signal via the first arm of the Mach-Zehnder interferometer.

12. The apparatus of claim 11, wherein an output of the first arm of the Mach-Zehnder interferometer is a modified optical signal including a phase shift compared to an output of the second arm of the Mach-Zehnder interferometer.

13. The apparatus of claim 10, wherein the interferometer is a truncated Mach-Zehnder interferometer including at least one input.

14. The apparatus of claim 13, further comprising a first laser source producing a first reference optical signal and a second laser source producing a second reference optical signal, wherein the first SQUID array applies the first voltage signal to the first reference optical signal, and the second SQUID array applies the second voltage signal to the second reference optical signal.

15. The apparatus of claim 14, wherein the first reference optical signal to which the first voltage signal is applied is received by a first input of the truncated Mach-Zehnder interferometer, and the second reference optical signal to which the second voltage signal is applied is received by a second input of the truncated Mach-Zehnder interferometer.

16. The apparatus of claim 15, wherein the truncated Mach-Zehnder interferometer outputs a combined optical signal including a timing difference that corresponds to the voltage difference between the first voltage signal and the second voltage signal.

17. The apparatus of claim 13, further comprising a laser source producing the at least one reference optical signal, wherein the voltage difference is applied to the at least one reference optical signal via the laser source, producing an output optical signal that is received by the truncated Mach-Zehnder interferometer and output as the modified optical signal, wherein the change in the modified optical signal is a frequency change.

18. An apparatus, comprising:
a first Superconducting Quantum Interference Device (SQUID) array receiving an electromagnetic signal and outputting a first voltage signal representing the received electromagnetic signal;
a second SQUID array receiving the electromagnetic signal and outputting a second voltage signal representing the received electromagnetic signal, wherein the electromagnetic signal is received from a signal source at a direction relative to the first and second SQUID arrays, and wherein the first and second SQUID arrays are spaced apart such that there is a phase difference between the electromagnetic signal as received at the first SQUID array and the electromagnetic signal as received at the second SQUID array that results in a voltage difference between the first voltage signal and the second voltage signal; and
a Second Harmonic Generator (SHG) crystal receiving a reference optical signal, wherein the voltage difference between the first and second voltage signals are applied to the SHG crystal as a bias voltage to modify the reference optical signal, such that the SHG crystal outputs a modified Second Harmonic optical signal including a change compared to the reference optical signal, the change being indicative of a phase difference between the electromagnetic signal as received at the first SQUID array and the electromagnetic signal as received at the second SQUID array, wherein the phase difference is indicative of the direction from which the electromagnetic signal is received.

19. The apparatus of claim 18, wherein the change in the modified Second Harmonic optical signal output is a change in amplitude related to the voltage difference, and the voltage difference is related to the phase difference between the electromagnetic signal as received at the first SQUID array and the electromagnetic signal as received at the second SQUID array.

20. The apparatus of claim 18, wherein the SQUID arrays are integrated onto a substrate with the SHG or located remotely from the SHG.

\* \* \* \* \*